G. T. HILLYARD.
EDUCATIONAL APPLIANCE.
APPLICATION FILED APR. 2, 1917.
1,286,631.
Patented Dec. 3, 1918.
Fig. 1
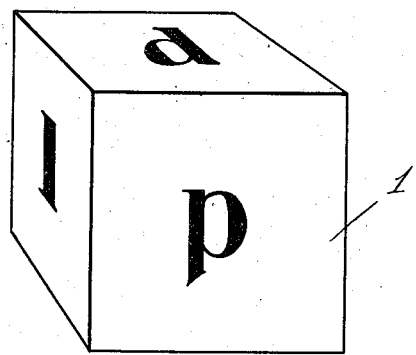
Fig. 2
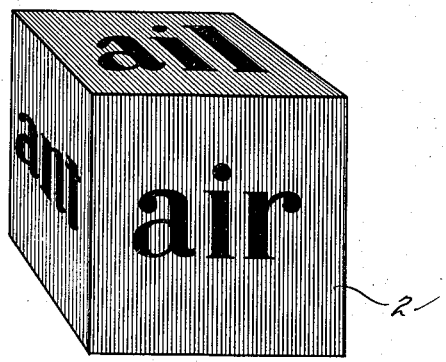
Fig. 3
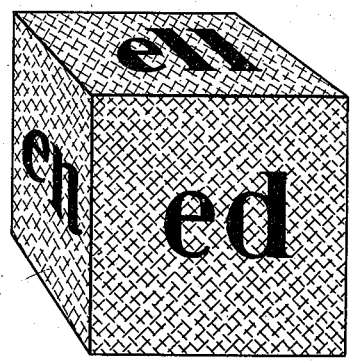
Fig. 4
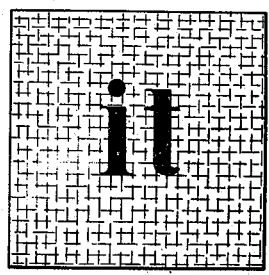
Fig. 5
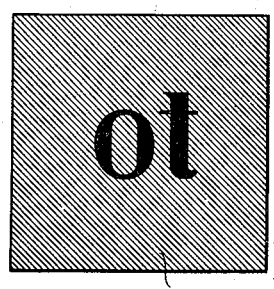
Fig. 6
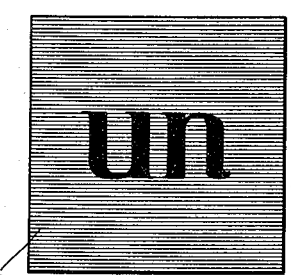
Fig. 7
Inventor
Grace T. Hillyard
By William A. Strck
Attorney

UNITED STATES PATENT OFFICE.

GRACE T. HILLYARD, OF OAKLAND, CALIFORNIA.

EDUCATIONAL APPLIANCE.

1,286,631.　　　　Specification of Letters Patent.　　Patented Dec. 3, 1918.

Application filed April 2, 1917. Serial No. 159,372.

*To all whom it may concern:*

Be it known that I, GRACE T. HILLYARD, a citizen of the United States, residing at 521 29th St., in the city of Oakland, in the county of Alameda and State of California, have invented certain new and useful Improvements in Educational Appliances, of which the following is a specification.

This invention relates to improvements in educational appliances and more specifically to a set of spelling blocks from which words, more particularly those of monosyllabic type may be formed.

The principal object of the invention is to provide an improved form of blocks for use in elementary school work whereby the pupil is taught the formation of the simpler words by the use of two blocks only. Another object is to construct a set of blocks having on certain ones the consonants or combination of consonants which form the initial part of the words and on others of the set phonograms which form the terminal part of such words.

It will be understood, however, that while I have illustrated and described the blocks as having the initial consonants and terminal phonograms, the set could just as readily be constructed by using the initial phonograms and terminal consonants.

Still another object of the invention is to provide a colored background on those blocks on which the phonograms are printed, the colors being those of the spectrum and being arranged on the blocks so that the colors in their proper order are presented when the phonograms are arranged in alphabetical order of the initial vowel.

With these and other objects in view the invention consists of certain novel features of construction, combinations and arrangements of parts hereinafter described and more specifically pointed out in the appended claims; it being understood that changes in form, proportion, size, and minor features of construction within the scope of the claims may be resorted to without departing from the spirit of the invention or sacrificing any of the advantages thereof.

To more fully comprehend the invention reference should be had to the drawings forming a part of the specification and wherein:

Figure 1 is a view in perspective of one of those blocks whereon the initial consonants appear.

Fig. 2 is a similar view of one of those blocks whereon is shown phonograms beginning with the vowel "a".

Fig. 3 is a view similar to Fig. 2 but showing a block having phonograms beginning with "e".

Fig. 4 is a view in elevation of a block whereon the phonograms begin with "i".

Fig. 5 is a view in elevation of a block whereon the phonograms begin with "o".

Fig. 6 is a view in elevation of a block having phonograms the initial letter of which is "u".

Fig. 7 is a view in plan of a set of blocks constructed in accordance with my invention.

Referring to the various parts by the same numerals of reference, my blocks are preferably constructed in the usual cubical shape as illustrated in Figs. 1 to 3 inclusive, and may be divided into two classes; those having on each face a single letter which is a consonant, a digraph or a combination of consonants such as "spl": and those having on each face a phonogram.

Blocks of the former class denoted by 1 all have a white surface, and these blocks are approximately equal in number to the number of the other class. The arrangement of the letters on these blocks may be as desired, for instance all the letters on a single block may be the same, or they may be in pairs on opposite faces, or as illustrated in the drawing the letter on each face may be different. In addition to carrying the initial consonants these blocks carry the digraphs "ch", "gh", "sh" and "th" as shown at 3 and also such combinations as "spl" and "thr" as shown at 4.

The blocks that carry the phonograms and which are denoted generally by 2 have colored surfaces, the "a" "e" "i" "o" "u" "w" and "y" phonograms being printed on red, orange, yellow, green, blue, indigo and violet respectively, thus when the phonograms are arranged in the order of their respective initial vowel, the colors of the spectrum are presented in their proper order.

In use the children are taught to place one of the white blocks in front of one of the colored ones thus forming a simple word. By a little assistance they are soon able to pronounce and recognize these words and then to form short sentences.

I claim as new and wish to cover by Letters Patent:

1. A set of blocks comprising letter blocks and phonogram blocks, each of the former having consonants on its faces and each of the latter having phonograms on its faces, the phonograms on the faces of any block having the same initial vowel.

2. A set of blocks comprising letter blocks and phonogram blocks, having colored surfaces, each of the letter blocks having terminal consonants on its faces and each of the phonogram blocks having phonograms on its faces, the phonograms of the same initial vowel being printed on correspondingly colored surfaces.

3. A set of blocks comprising letter blocks and phonogram blocks, each of the former having initial consonants on a white background on each of the faces, and each of the latter having phonograms on a colored background, the phonograms having the same initial vowel, having also the same colored background.

4. A set of blocks comprising two groups, one group having a white surface and initial consonants on the faces thereof, the other group having surfaces comprising the colors of the spectrum and having phonograms on the faces thereof, the initial vowel of the phonograms and the colored surfaces on which the phonograms are printed being in the same relative order in the alphabet and spectrum respectively.

In testimony whereof I affix my signature.

GRACE T. HILLYARD.